(12) United States Patent
Goldberg et al.

(10) Patent No.: US 6,411,683 B1
(45) Date of Patent: Jun. 25, 2002

(54) AUTOMATED TELEPHONE CALL DESIGNATION SYSTEM

(75) Inventors: Randy G. Goldberg, Princeton; Robert Edward Markowitz, Glen Rock; Kenneth H. Rosen, Middletown, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/096,025

(22) Filed: Feb. 9, 2000

(51) Int. Cl.$^7$ ................................................ H04M 1/64
(52) U.S. Cl. .................... 379/88.01; 704/251; 704/256; 704/270.1
(58) Field of Search .............................. 379/34, 35, 38, 379/67.1, 88.01–88.04, 88.07, 201, 204, 205, 265, 266, 380, 202.01, 203.01, 204.01, 205.01, 206.01; 704/236, 240, 251, 256, 270, 270.1; 707/6

(56) References Cited

U.S. PATENT DOCUMENTS

| | | | | |
|---|---|---|---|---|
| 5,396,542 A | * | 3/1995 | Alger et al. ................ | 379/67.1 |
| 5,596,634 A | * | 1/1997 | Fernandez et al. .......... | 379/201 |
| 5,625,748 A | * | 4/1997 | McDonough et al. ....... | 704/251 |
| 6,185,531 B1 | * | 2/2001 | Schwartz et al. ........... | 704/256 |

FOREIGN PATENT DOCUMENTS

| | | | | |
|---|---|---|---|---|
| EP | | 0627837 A1 | 12/1994 | ............ H04M/3/38 |

OTHER PUBLICATIONS

Gillick et al., Application of Large Vocabulary Continous Speech Recognition Topic and Speaker Indentification Using Telephone Speech, Apr. 1993, Acoustics, Speech, & Sig. Processing, ICASSP–93, ISBN 0–7803–0946–4, vol. II, pp. 471–474.*
Gorin et al., How May I Help You?, Oct. 1996, Interactive Voice Technology for Telecommunication Applications, Third IEEE Workshop, ISBN 0–7803–3238–5, pp. 57–60.*
Riccardi et al., A Spoken Language Ssystem for Automated Call Routing, Apr. 1997, Acoustics, Speech, and Signal Processing, 1997 IEEE International Conference, ISBN 0–8186–7910–0, vol. II, pp. 1143–1146.*

* cited by examiner

Primary Examiner—Fan Tsang
Assistant Examiner—Roland G. Fuster

(57) ABSTRACT

An automated telephone call designation system includes a database that stores a plurality of keywords where each keyword is associated with at least one topic designation. The system monitors the conversation of an ongoing telephone call by utilizing voice recognition software resident in a network to detect the use of the keywords in the conversation. The keywords used in the conversation are correlated to the topic designation(s) associated with the keywords. Based on the correlation of the keywords to the topic designation(s) associated with the keywords, a topic for the ongoing telephone call is designated. A third party that desires to join an ongoing conversation of interest reviews the topics of the ongoing conversations and is bridged into the conversation of interest.

7 Claims, 2 Drawing Sheets

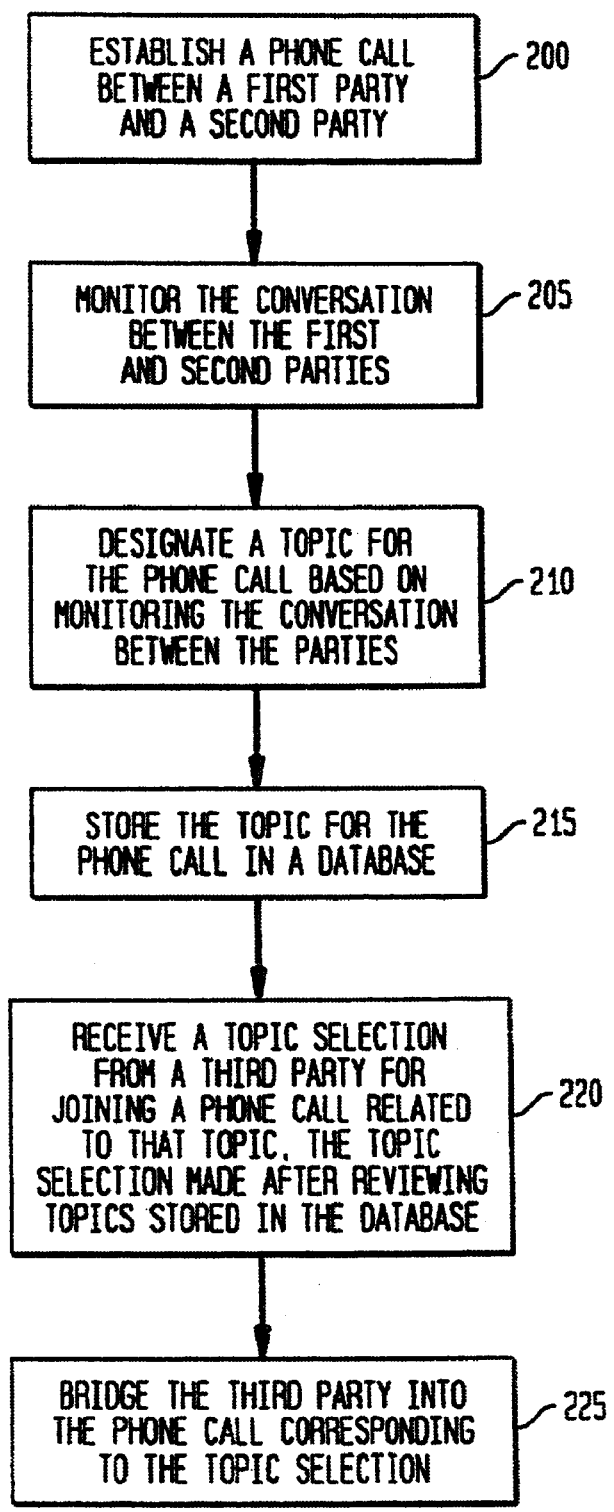

AUTOMATED TELEPHONE CALL DESIGNATION SYSTEM

BACKGROUND OF THE INVENTION

The present invention relates to a telecommunications system. More specifically, the invention provides for a method and apparatus for real-time monitoring of ongoing party line telephone conversations to determine the topic of the conversation and for providing access into the telephone conversation for additional callers that are interested in the topic being discussed.

Currently, it is possible to provide a service for permitting a caller to access an on-going telephone conversation concerning a topic of interest by having the caller dial a specific telephone number, such as by dialing a 900 toll service. Typically, a specific 900 telephone number relates to a single conversation topic. Accordingly, a caller manually dials the 900 telephone number that corresponds to the telephone conversation topic of interest and the caller is connected to the call and is able to participate in that particular conversation. However, this methodology suffers several drawbacks. These drawbacks include the requirement to pre-define, i.e., before the conversation is established, the topic of the conversation and that once defined, the topic cannot be modified after establishment of the initial telephone call. An additional drawback is that a separate 900 telephone number must be dedicated to each different telephone conversation.

It is also known how to establish a service where a caller who is interested in participating in an on-going telephone conversation is able to dial into a telephone network and select a particular conversation to participate in from a topic listing of on-going telephone conversations. However, a drawback with this system, as with the previous method addressed above, is that the topic listing for each telephone conversation must also be pre-defined and stored in a database. A caller who wants to know of on-going conversations that they may want to participate in reviews the database listing of topics of on-going conversations and selects a conversation from this topic listing. However, in natural conversation during a telephone call the topic of the phone call may change considerably depending on the desires of the participants. The currently known system for defining topics for telephone conversations does not allow for the topical description of the on-going conversation to change in response to the actual subject matter that is being discussed at any particular time during the phone conference. Thus, the defined topic for the telephone call may become inaccurate with time and thus a caller who may desire to participate in the call will not be able to accurately determine the topic of the call prior to joining the call.

Therefore, it would be desirable to provide a telecommunications system that is able to monitor on-going telephone calls to accurately determine the subject matter of the conversations during the entire course of the calls and, based on this monitoring, assign a topic to each call. Callers that desire to participate in an on-going telephone call concerning a topic of interest could review the topics of on-going calls and be bridged into a telephone call that was discussing the topic of interest.

SUMMARY OF THE INVENTION

The drawbacks in the prior art are overcome by the present invention for an automated telephone call topic designation system. In accordance with the present invention, a plurality of keywords are stored in a database where each keyword is associated with at least one topic designation. The system monitors the conversation of an on-going telephone call by utilizing voice recognition software resident in a network to detect whether any of the keywords are used in the conversation. Detected keywords are used to designate a topic for the conversation. A third party desiring to join an on-going conversation of interest reviews the topics of the on-going conversations and is bridged into a conversation of interest.

In this manner, the present invention provides for designating topics to ongoing phone calls based upon monitoring the conversations of the phone calls and for bridging a third party into a conversation of interest.

BRIEF DESCRIPTION OF THE DRAWINGS

FIG. 2 illustrates a process flow chart for the method steps in practicing an embodiment of the present invention.

DETAILED DESCRIPTION

Figure 1:
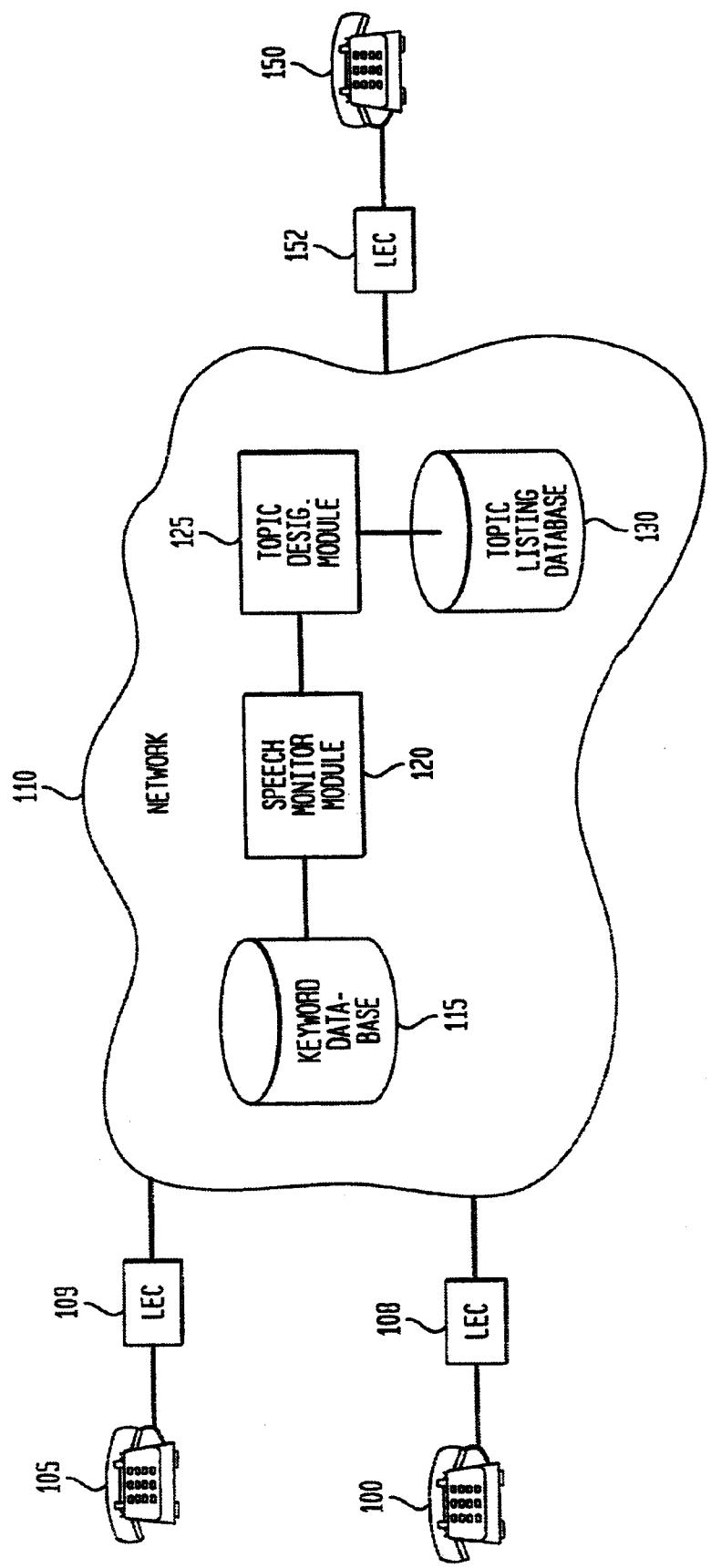
FIG. 1 illustrates an automated telephone call designation system in accordance with an embodiment of the present invention.

FIG. 1 illustrates one embodiment for an automated telephone call designation system in accordance with the present invention. In FIG. 1, a first party using telephone 100 has established a telephone call with a second party at telephone 105. The telephone call between the first and second parties has been established through network 110. The party at phone 100 connects into network 110 through local exchange carrier (LEC) switch 108 and the party at phone 105 connects to the network through LEC switch 109. Network 110 can be any type of network that is capable of establishing a telephone call between multiple parties. For example, network 110 can be the Public Switched Telephone Network (PSTN), a private telephone network that is connected to the PSTN, or an integrated service provider network, such as an Internet service provider. The present invention is not limited to any particular type of network for establishing a telephone call between various parties nor is it limited to requiring a network for establishing the phone call. For example, a telecommunications bridge could be utilized to establish the phone call. The only requirement is that the system be capable of establishing the telephone call.

When practicing the present invention, a third calling party at telephone 150 desires to participate in an on-going telephone conversation that involves a discussion of a topic of interest to the caller at telephone 150. The caller at phone 150 is also connected to network 110 through, for example, LEC switch 152. For purposes of illustration, the specification will discuss how the topic of the conversation between the first party and the second party at telephones 100 and 105, respectively, is determined and how this information is provided to the calling party at telephone 150. Whereas the description will only discuss topic designation for the one ongoing telephone conversation, it is understood that the present invention is capable of monitoring multiple telephone conversations and would employ the methods and apparatus described herein to designate topics for all ongoing telephone conversations and provide these topics to a third calling party for review.

Network 110 contains a keyword database 115, a speech monitoring module 120, a topic designation module 125, and a topic listing database 130. For the ongoing party line telephone conversation between the parties at telephones 100 and 105, network 110 will monitor the spoken words of each party to detect keywords that are used in the conversation and will utilize these detected keywords to analyze the frequency of occurrence of these keywords to designate a topic for the ongoing conversation. In this manner, the parties engaged in the conversation do not pre-define the topic of the conversation; rather, the contents of the conversation between the two parties is utilized to define the topic of the conversation. Since network 110 continues its monitoring and analyzing functions during the entire course of the conversation, the topic designation for the conversation by network 110 can change in response to the conversation topics discussed by the participants in the phone call.

Keyword database 115 stores keywords that are associated with topic areas and are used to designate topics for phone conversations. Keywords can be stored for any number of topic areas based on the desires of the network subscribers. For example, if it is known that subscribers to the service are likely to engage in telephone conversations that are directed to Civil War topics, and thus utilize words in the conversation related to the Civil War, keywords can be stored in database 115 that are likely to correspond to the words that are used in conversations directed to the Civil War. Examples of keywords that may be stored in keyword database 115 that could be used to categorize a conversation directed to Civil War topics are "Civil War", "Gettysburg", "Lincoln", "Union", "Confederate", "Lee", and "Grant".

As stated above keywords for any number of topic areas can be stored in keyword database 115. If the topic of football is likely to be discussed and if it is likely that subscribers would like to be able to participate in ongoing conversations related to football, keywords for the topic area of "football" could be stored in keyword database 115. In order to attempt to determine what topic areas may be of interest to subscribers, and thus what sets of keywords should be stored in database 115, the service provider could conduct a survey of subscribers to determine topic areas of interest and keywords likely to be used in conversations related to these topic areas. In this manner, the keyword database could be provided with keywords that are likely to be used by subscribers of the service.

The keywords for the topic areas that are stored in database 115 are utilized by speech monitoring module 120. Speech monitoring module 120 contains known speech recognition software for monitoring the spoken conversation between the parties at telephones 100 and 105. Speech monitoring module 120 will monitor the conversation of the parties to detect the occurrence of the keywords that are stored in database 115 in the conversation of the parties. Thus, speech monitoring module 120 utilizes keyword spotting techniques in monitoring the conversation of the parties. For example, if the keyword "Civil War" is stored in database 115, speech monitoring module 120 will monitor the conversation to determine if this keyword is utilized in the conversation. If the keyword "Civil War" is used in the conversation, it may be likely that the topic of the conversation is directed to the Civil War. Speech monitoring module 120 monitors the ongoing conversation between the parties at phones 100 and 105 to determine the occurrence of all keywords stored in database 115 during the conversation.

Speech monitoring module 120 provides data related to the occurrence of the use of keywords in the telephone conversation between the parties at phones 100 and 105 to topic designation module 125. Topic designation module 125 analyzes the frequency of occurrence of keywords in the conversation between the parties at phones 100 and 105 and will utilize this analysis of the occurrence of the keywords to designate a topic for the conversation between the parties.

Analysis of the occurrence of keywords during a conversation is not required, but it is desirable, in order to more precisely define the topic area of the conversation. Whereas the topic of the telephone conversation could be defined based on the single occurrence of any keyword in the conversation and correlation of this keyword to a topic area, this methodology may not result in the most precise definition of the topic area for the conversation. For example, if the two parties were discussing World War II and, during the course of the conversation, drew an analogy between a Civil War event and a World War II event, and thus utilized the keyword "Civil War" in the conversation, the topic of the conversation could be categorized as a Civil War conversation, rather than as a World War II conversation, due to the occurrence of the keyword "Civil War" in the conversation. Additionally, the situation where keywords were utilized in a conversation that are associated with two separate topic areas could present an issue with respect to which topic area most accurately defines the topic of the conversation. Therefore, analysis of the occurrence of keywords during the course of the conversation would most advantageously define the topic area of the conversation.

Various methods could be used to analyze the occurrence of keywords during the course of the conversation and the present invention is not limited to any particular methodology. In one method, decisions could be based upon the frequency of occurrence of keywords that are associated with any particular topic area during any defined time period. For example, if the keyword "Gettysburg" was utilized in a conversation a single time during the first 20 minutes of the phone call, it may not be likely that the topic of the conversation is directed to that topic with which the keyword "Gettysburg" is associated with, e.g., the topic of the Civil War. If the keyword "Gettysburg" was used 5 times during the first 5 minutes of the conversation, however, it may be likely that the topic of the call is related to the topic of the Civil War. Thus, in this methodology, if the frequency of occurrence of the use of the keyword matches defined criteria, the conversation topic of the call could be designated as the topic area that is associated with the keyword.

Because certain keywords may be utilized to define more than one topic area, it may be desirable to analyze the occurrence of keywords in a conversation by correlating at least two different keywords utilized in the conversation that are associated with a particular topic area before designating the topic of the phone call as being directed to that particular topic area. For example, because the keyword "battle" may be a keyword for the topic area "Civil War" as well as for the topic area "World War II", before designating any particular telephone conversation as being directed to the topic of the Civil War based on the use of the keyword "battle", it may be desirable to correlate the keyword "battle" to at least one other keyword associated with this topic area, e.g., "Gettysburg", before designating the topic of the conversation as being directed to the topic of the Civil War.

Therefore, topic designation module 125 analyzes the occurrences of the keywords used in a conversation to designate a topic for the conversation. Once topic designation module 125 designates a topic for an ongoing conversation, module 125 provides the topic designation to topic listing database 130. Topic listing database 130 stores a listing of topics for each ongoing party line phone call in network 110.

A third party caller at, for example, telephone 150, who desires to join an ongoing party line phone conversation directed to a topic of interest calls into network 110. After logging into network 110, the caller at phone 150 can review the topics of the ongoing phone calls as provided to the user by network 110 through topic listing database 130. If the caller at telephone 150 desires to join a particular ongoing conversation, the caller at phone 150 can enter his/her selection into network 110 which in turn will bridge the caller into the ongoing telephone call, such as between the parties at phones 100 and 105.

When the caller at telephone 150 dials into network 110, the caller can be prompted by the network to enter the service that he/she desires from the network. For example, the network can ask the caller to respond if he/she wants to join an ongoing telephone conversation. Network 110 can audibly provide a listing of all of the services available on the network and can also, if the caller at phone 150 desires to participate in an ongoing conversation, audibly provide the caller with a listing of the topics of presently ongoing telephone conversations as obtained from topic listing database 130. The caller at phone 150 can audibly enter his/her selections into network 110 where the network will use well-known voice response technology to recognize the caller's input, or can enter his/her selections by using the telephone's touch tone keypad.

In this manner, a caller at phone 150 who desires to join an ongoing telephone conversation involving a topic of interest can review the topics of ongoing telephone conversations and join a particular conversation.

It was stated previously that speech monitoring module 120 monitors ongoing telephone conversations to detect keywords that are used in the conversations and that topic designation module 125 analyzes the occurrence of these keywords to designate a topic for the ongoing conversations. However, even after a topic is designated for a conversation, speech monitor 120 continues to monitor the conversation and topic designation module 125 continues to analyze the frequency of occurrence of keywords in the conversation. The continuous monitoring and analysis of keywords during the entire conduct of the conversation is desirable because after the initial designation of a topic for a conversation, it is possible that the topic of the conversation may change over time due to the natural flow of information in a telephone conversation between two or more participants. Therefore, whereas the initial designation for the topic of the conversation may have been accurate after initiation of the phone call, the initial topic designation for that phone call may become inaccurate if the topic of the conversation changes later in the phone call.

To maintain accurate topic designations for phone calls during the entire course of the conversation during the phone call, topic designation module 125 continues to analyze the frequency of occurrence of keywords during the entire course of the phone call and modifies the topic designation for the phone call as appropriate. Updated topic designations for the phone call are provided to topic listing database 130.

Various methods could be utilized in the present invention for ensuring that the topic designation for the phone call is accurate during the entire course of the phone call. The present invention is not limited to any particular methodology. One method for ensuring accuracy is to continue to analyze the occurrence of keywords after designation of the topic for the call. For example, a time period could be established that commences upon designation of a topic for a particular conversation and the frequency of occurrence of the use of keywords during this time period could be analyzed. If keywords associated with the designated topic area are utilized in the conversation a specified number of times, the topic designation for that conversation would be maintained. A new time period would then commence for analysis of the frequency of use of keywords associated with the topic area at the expiration of the first time period. If keywords associated with the designated topic area are not utilized in the conversation a specified number of times, and if keywords associated with other topic areas are used, the topic designation for the phone call could be changed to reflect the topic area that is associated with the keywords that are detected.

Different criteria could be established with respect to analyzing the frequency of occurrence of keywords for either maintaining a particular topic designation for a phone conversation or for changing the topic designation for a phone conversation. This may be desirable because a lesser frequency of occurrence of keywords that are associated with a particular designated topic area could be used by the participants in the phone conversation while still talking about the same subject matter. However, a greater frequency of occurrence of keywords that are associated with a different topic area than the topic area that is designated for the phone conversation would most likely indicate that the subject matter of the conversation has changed. Therefore, a lesser frequency of use of keywords associated with the designated topic area of a call does not necessarily indicate that the topic of the call has changed; however, a greater frequency of use of keywords that are not associated with the designated topic area of the call most likely indicates that the topic of the call has changed.

The basic method steps for practicing an embodiment of the present invention are illustrated in FIG. 2. As shown, in step 200, a phone call is established between a first party and a second party. In step 205, the speech monitoring module 120 monitors the conversation between the first party and the second party during the phone call. Based on the monitoring of the phone call, topic designation module 125 designates a topic for the phone call, step 210. The designated topic for the phone call is stored in topic listing database 130, step 215. In step 220, a third party, after reviewing the stored topics of all ongoing phone calls, makes a topic selection for a phone call that the third party desires to join. In response to the topic selection by the third party, the third party is bridged into the ongoing phone call that corresponds to the topic selection made by the third party, step 225.

The method steps shown in FIG. 2 are not intended to be all inclusive of all of the features of the present invention, as described in this specification. The specification, when read as a whole, fully describes the automated telephone call designation system of the present invention.

As disclosed, an automated telephone call designation system is provided. The present invention provides for designating topics to ongoing phone calls based upon monitoring the conversations of the phone calls and bridging a third party into a conversation of interest. The disclosed embodiments are illustrative of the various ways in which the present invention may be practiced. Other embodiments can be implemented by those skilled in the art without departing from the spirit and scope of the present invention.

What is claimed is:

1. A method for bridging a phone call from a third party into an ongoing telephone call between persons comprising the steps of:

establishing a first phone call between a first person and a second person;

monitoring the natural conversation between the first person and the second person in the first phone call;

designating and periodically updating a topic for the first phone call based on monitoring the natural conversation between the first person and the second person;

storing the topic designation for the first phone call in a database;

establishing a second phone call with the third person;

receiving a phone call topic selection from the third person, said phone call topic selection designating said stored topic designation for the first phone call; and bridging the second phone call into the first phone call in response to said phone call topic selection by the third person.

2. The method of claim 1 wherein said step of monitoring the conversation between the first party and the second party comprises the step of detecting keywords used in the conversation, wherein said each of said keywords is associated with at least one topic area.

3. The method of claim 2 wherein said step of designating a topic for the phone call comprises the step of correlating the detected keywords used in the conversation to the topic designation associated with the keywords.

4. The method of claim 2 further comprising the step of analyzing the detected keywords and wherein said step of designating a topic for the first phone call is based on the analysis of the detected keywords.

5. The method of claim 4 wherein said step of analyzing the detected keywords comprises the step of determining the frequency of occurrence of the detected keywords that are associated with a topic designation during a specified time period.

6. The method of claim 4 wherein said step of analyzing the detected keywords comprises the step of determining whether at least two different keywords associated with the same topic designation are used in the conversation during a specified time period.

7. The method of claim 4 further comprising the step of determining whether the designated topic for the first phone call should be modified based on continuously monitoring and analyzing the keywords used during the entire course of the conversation.

* * * * *